T. B. SHAW.
FEED RACK.
APPLICATION FILED OCT. 25, 1909.
988,599.
Patented Apr. 4, 1911.
2 SHEETS—SHEET 2.
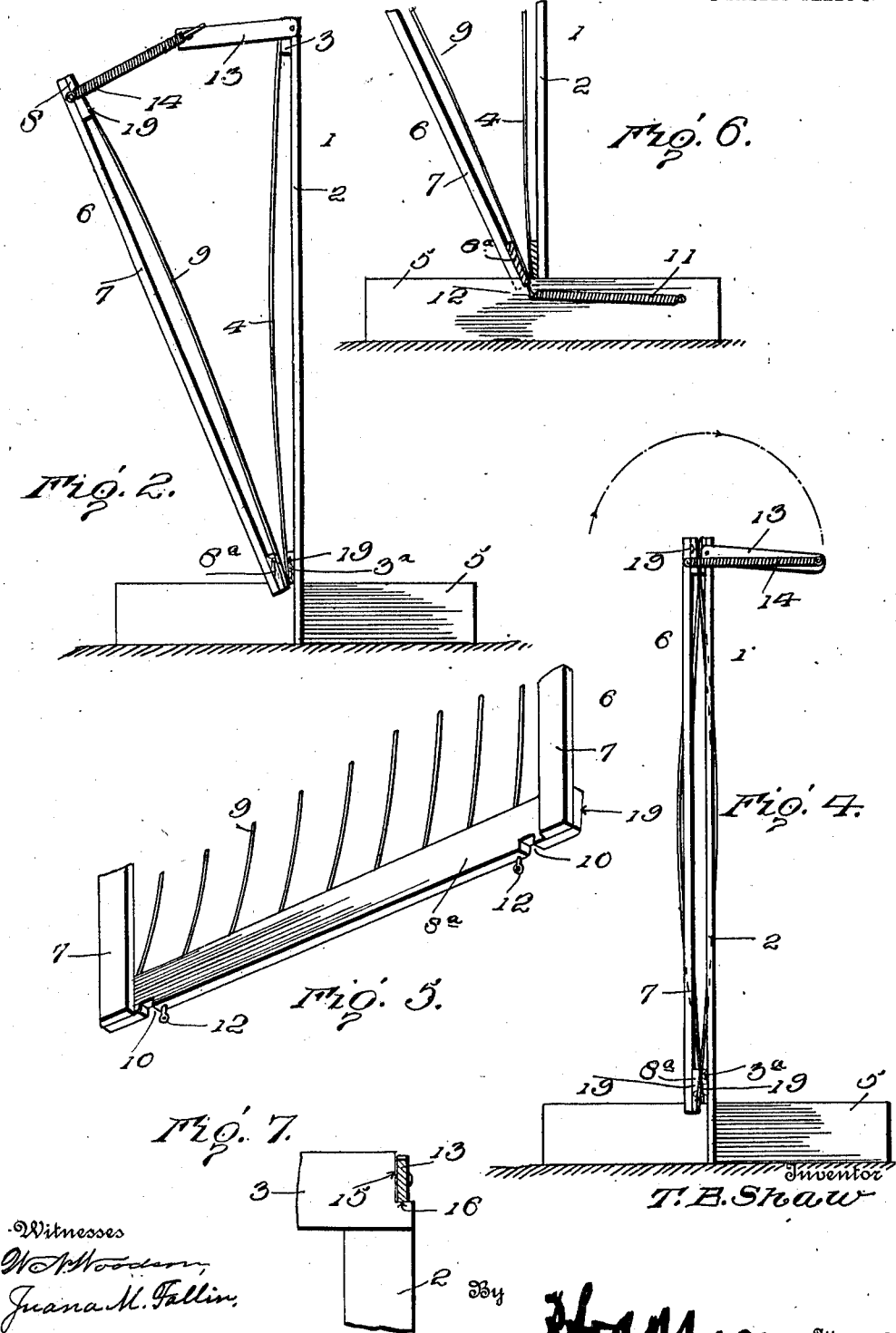
T. B. Shaw

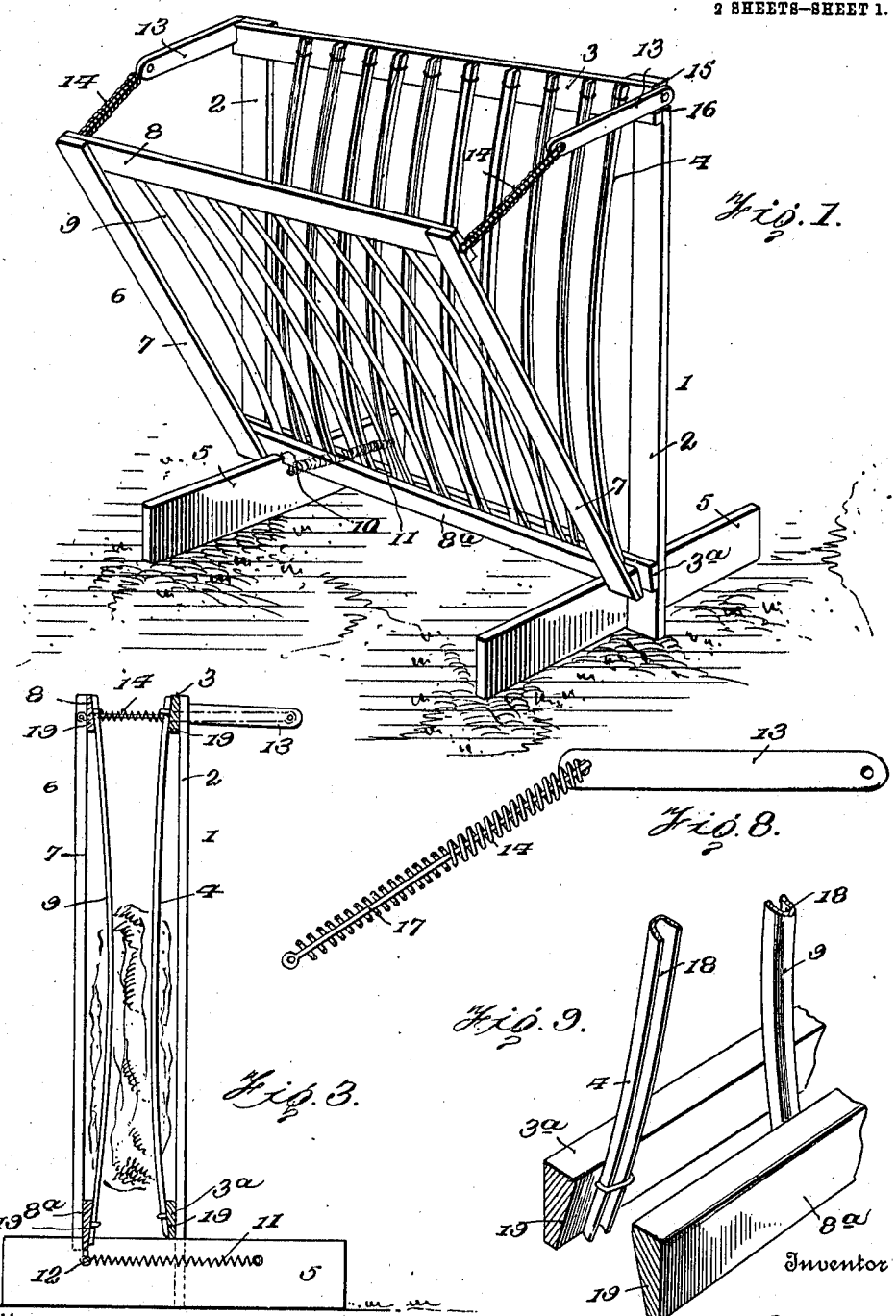

UNITED STATES PATENT OFFICE.

THEODORE B. SHAW, OF BELLEVUE, WASHINGTON.

FEED-RACK.

988,599.  Specification of Letters Patent.  Patented Apr. 4, 1911.

Application filed October 25, 1909.  Serial No. 524,450.

*To all whom it may concern:*

Be it known that I, THEODORE B. SHAW, citizen of the United States, residing at Bellevue, in the county of King and State of Washington, have invented certain new and useful Improvements in Feed-Racks, of which the following is a specification.

The present invention comprehends certain new and useful improvements in feed racks, and the invention has for its object a particularly efficient device of this character which is designed primarily for use in feeding poultry and is adapted to contain a quantity of clover or similar food, in such a manner that the poultry have free access thereto, while at the same time the food is held firmly in place whereby to be prevented from being scattered and to be kept clean.

A further object of the invention is a feed rack which is arranged to compensate for different quantities of food contained therein; which is susceptible of being opened to permit the food to be conveniently introduced therein; and which is readily portable and is quite simple and durable in construction.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawings, in which:

Figure 1 is a perspective view of my improved feed rack showing the same in open position; Fig. 2 is an end view thereof; Fig. 3 is a transverse section illustrating the operative position of the rack; Fig. 4 is an end view of said rack in folded position; Fig. 5 is a fragmentary perspective view of the lower portion of the movable frame; Fig. 6 is a detail sectional view illustrating the manner of mounting the lower portion of the movable frame; Fig. 7 is a detail view showing a link pivoted in the recesses; Fig. 8 is an enlarged detail view of one of the links and the spring coöperating therewith; and, Fig. 9 is a fragmentary perspective view of the frames showing the channels in the inner sides of the rods.

Corresponding and like parts are referred to in the following description and indicated in all the views of the drawings by the same reference characters.

A feed rack constructed in accordance with my invention, consists essentially of two sides or frames 1 and 6 which are arranged in opposed relation, the frame 1 being stationary and the frame 6 being relatively movable. The frames are of substantially the same size and shape and are preferably rectangular, although not necessarily so. The frame 1 is disposed vertically and is composed of side bars or standards 2 and upper and lower cross bars, designated 3 and 3ª respectively. The frame is equipped with a grating of any suitable design and in the present instance this grating is formed by a plurality of vertical resilient rods 4 that extend across the frame at regular transverse intervals and are securely fastened to the upper and lower cross bars. The side bars 2 of the frame are extended downwardly below the lower cross bar thereof and such extended portions have horizontal base bars or feet 5 secured thereto, the base bars extending perpendicularly on both sides of the plane of the frame and serving to maintain the same in an upright position.

The movable frame 6 is substantially similar to the relatively stationary frame 1 and comprises side bars 7 and upper and lower cross bars 8 and 8ª, a plurality of vertical resilient rods 9 extending across the movable frame to provide a grating similar to the grating above described. The movable frame is disposed on one side of the relatively stationary frame with the lower cross bar 8ª resting on the adjacent projecting portions of the base bars 5. In the present instance the cross bar 8ª of the movable frame is recessed, as indicated at 10, in order to embrace the upper edges of the projecting portions of the base bars and thus maintain the frame 6 against becoming accidentally shifted laterally out of alinement with the frame 1. Screw eyes 12 are secured in the lower edge of the cross bar 8ª near the opposite ends thereof, and are engaged with tension springs 11 which extend along the opposing faces of the base bars 5 and are fastened thereto, whereby to tend to yieldingly hold the lower cross bar 8ᵃ against the lower cross bar 3ᵃ of the frame 1. This connection is employed in lieu of hinges, for a purpose to be hereinafter disclosed, and permits the upper end of the movable frame 6 to be swung away from the stationary frame to assume an open position in upwardly divergent relation thereto, as illustrated in Fig. 1. In such position of the parts, clover or like material to be fed to the poultry, may be conveniently introduced between the frames.

The upper ends of the frames 1 and 6 are connected through the medium of coil springs 14 that are secured at one end to the side edges of the movable frame 6 near the respective upper corners thereof. The other ends of these springs are pivotally connected to the free ends of links 13 that are pivotally mounted at their fixed ends in recesses 15 formed in the side edges and at the upper corners of the stationary frame 1. The links have a limited swinging movement about horizontal axes and are adapted in one position to extend toward the movable frame 6 in order to support the same in the open position shown in Fig. 1, the downward movement of the links being limited in such position by the upwardly facing shoulders 16 provided at the lower ends of the recesses. By lifting the links 13 and swinging the same over on the opposite side of the plane of the stationary frame from the movable frame, the upper end of the latter is swung toward the former and the movable frame assumes an upright or operative position in opposed relation to the stationary frame, so as to hold the interposed material firmly in place (see Fig. 3). The links are moved downwardly past a center and rest against the shoulders 16, whereby to retain the movable frame in closed position against becoming accidentally opened. When the links are turned over, as just described, the coil springs 14 lie along the outer faces thereof, as shown, sufficient clearance being afforded for this purpose by the recesses 15.

As a precautionary measure stiffening rods 17 are disposed within the coil springs 14 to prevent the same from possibly buckling, the stiffening rods being fastened at one end with the springs and being free at their other ends, so as not to interfere with the expansion thereof.

Attention is here directed to the fact that the resilient rods 4 and 9 forming the respective gratings, are arranged in staggered relation and are provided along their inner or adjacent sides with longitudinal channels 18 which afford a firmer grip on the interposed material. In order to secure a still better hold on the material, the rods of the respective gratings are bowed toward each other, as best seen in Fig. 2, and are retained in such bowed position by having their ends secured to the inner faces of the cross bars of the frame that are suitably beveled for this purpose, as indicated at 19.

In describing the practical use of the invention, it is to be assumed that the movable frame is in the inclined or open position illustrated in Fig. 1. The material to be fed to the poultry may be then conveniently inserted in the rack between the bowed gratings of the frame, after which the links 13 are turned over on opposite sides of the stationary frame from the movable frame to cause the latter to assume a substantially upright position in opposed relation to the former and thus hold the material firmly in place. The poultry thus have free access to the food and can peck at the same through the gratings, while at the same time the rods of the gratings engage the food so as to effectually prevent the same from becoming scattered, as would result in considerable waste. It is also to be noted that with this device the food is kept perfectly clean. Inasmuch as the movable frame is connected to the stationary frame at its respective corners through the medium of the springs 11 and 14, said movable frame is rendered capable of yielding freely laterally in such operative position, so as to be maintained at different distances from the stationary frame to compensate for different quantities of material which may be placed in the rack. When all of the material has been removed from the rack by the poultry, the springs 11 and 14 draw the movable frame against the stationary frame so as to provide a compact structure, the bowed rods of the gratings interlocking by virtue of their staggered disposition.

From the foregoing description in connection with the accompanying drawings, it will be apparent that I have provided an improved feed rack which is particularly efficient in use and is arranged to compensate for a quantity of material contained therein; which is simple, durable and light in construction and may be easily and cheaply manufactured; and which consists of comparatively few parts that may be readily assembled and are not likely to get out of order.

Having thus described the invention what is claimed as new is:

1. A feed rack including separate co-acting sides disposed in opposed relation and adapted to receive material therebetween, and means for continuously urging one of the sides toward the other without changing the angular relation between the sides.

2. A feed rack including separate co-acting sides arranged in approximately parallel relation and adapted to receive material therebetween, and means for continuously urging one of the sides toward the other without changing the angular relation between the sides.

3. A feed rack including separate co-acting sides disposed in opposed relation and adapted to receive material therebetween, one of the sides having both its upper and lower ends movable freely toward and away from the other side, and means for continuously urging the movable side toward the other side.

4. A feed rack including separate co-acting sides disposed in opposed relation and adapted to receive material therebetween, one of the sides having both its upper and lower ends movable toward and away from the other side, and tension springs connecting the sides at both their upper and lower ends.

5. A feed rack including separate co-acting sides disposed in opposed relation and adapted to receive material therebetween, one of said sides having a free sliding movement toward and away from the other side, and means for continuously urging the movable side toward the other side.

6. A feed rack comprising a relatively stationary upright frame, a second frame disposed on one side of the stationary frame in opposed relation thereto, and an operative connection between the second frame and the stationary frame, said connection embodying links pivoted at one end to the stationary frame and springs connected at one end to the free ends of the links and at their other ends to the movable frame, the links being adapted to be turned about their pivots to maintain the second frame at different distances from the stationary frame.

7. A feed rack including a side, a supporting member projecting angularly from the side, a second side mounted on the supporting member and arranged in opposed relation to the first side, the second side being freely slidable along the member toward and away from the first side, and means for urging the second side toward the other side.

8. A feed rack including separate co-acting sides disposed in opposed relation and adapted to receive material therebetween, one of said sides having a free lateral sliding movement toward and away from the other side, means for urging the movable side toward the other side, and means for holding the side against longitudinal movement relative to the other side.

9. A feed rack embodying opposed marginal frames, and gratings secured across the respective frames and adapted to have food placed therebetween, the gratings being bowed inwardly toward each other to firmly engage the food.

10. A feed rack comprising opposed marginal frames, and a plurality of rods secured across the respective frames to form gratings designed to have food placed therebetween, the rods of the gratings being bowed inwardly toward each other to firmly engage food.

11. A feed rack comprising opposed marginal frames, a plurality of rods secured across the respective frames to form gratings designed to have food placed therebetween, the rods of the gratings being formed with inwardly facing or opposed channels to engage the food.

12. A feed rack comprising opposed marginal frames, gratings secured across the respective frames and adapted to have food placed therebetween, and means for yieldingly connecting the frames to compensate for different quantities of food, the gratings of the frames consisting of a plurality of rods extending in the same direction and bowed inwardly toward each other to firmly engage the food, the bowed rods of the gratings being arranged in staggered relation and being adapted to interlock when the frames are closed against each other.

13. A feed rack including a side, a supporting member projecting laterally from the side, and a second side resting on the supporting member and disposed in opposed relation to the first side, the second side being formed with a recess receiving the supporting member to hold the second side against longitudinal movement relative to the other side.

14. A feed rack including a side, a supporting member projecting laterally from the lower end of the side, a second side arranged in opposed relation to the first side and resting on the supporting member and slidable along the same toward and away from the first side, and means for urging the movable side toward the other side, the movable side being formed with a recess receiving the supporting member to guide the movable side in its sliding movement and to hold the movable side against longitudinal movement relative to the other side.

15. A feed rack including separate co-acting sides disposed in opposed relation and adapted to receive material therebetween, one of said sides being movable toward and away from the other side, a link pivoted to one of the sides, a stop limiting the turning movement of the link and adapted to support the same in opposite positions wherein it extends toward or away from the other side, and a connection between the free end of the link and the other side.

16. A feed rack including separate co-acting sides disposed in opposed relation and adapted to receive material therebetween, one of the sides being movable toward and away from the other side, a link pivotally connected to one of the sides, and a spring connecting the free end of the link with the other side.

17. A feed rack including separate series of substantially parallel bars arranged in staggered relation, one series of bars being movable toward and away from the other series and being adapted in one position to interlock with the bars thereof.

18. A feed rack including separate series of substantially parallel bars, one series of bars being movable toward and away from the other series, and means for urging the movable series toward the other series, the bars of the movable series being arranged in staggered relation to the bars of the other series and being adapted to pass therebetween when moved toward the same.

19. A feed rack including opposed series of substantially parallel bars arranged in staggered relation and bowed inwardly toward each other to firmly engage the material placed therebetween.

20. A feed rack including opposed series of substantially parallel bars arranged in staggered relation and bowed inwardly toward each other to firmly engage material placed therebetween, one series of bars being movable toward the other series to interlock therewith.

In testimony whereof I affix my signature in presence of two witnesses.

THEODORE B. SHAW. [L. S.]

Witnesses:
 GEO. M. JACOBS,
 E. FRENCH.

---

Copies of this patent may be obtained for five cents each, by addressing the "Commissioner of Patents, Washington, D. C."